US008210197B2

(12) United States Patent
Jensen et al.

(10) Patent No.: US 8,210,197 B2
(45) Date of Patent: Jul. 3, 2012

(54) CLEANING SYSTEM FOR CLEANING A VALVE SEAT

(75) Inventors: Karl-Aage Lindholm Jensen, Odense (DK); Per Schneidereit, Vamdrup (DK); James Louis Larsen, Kenosha, WI (US); Christian Karl Thommen, III, Salem, WI (US); Roger James Ashton, Kenosha, WI (US)

(73) Assignees: Alfa Laval Kolding A/S, Kolding (DK); Alfa Laval Corporate AB, Lund (SE)

( * ) Notice: Subject to any disclaimer, the term of this patent is extended or adjusted under 35 U.S.C. 154(b) by 320 days.

(21) Appl. No.: 12/546,838

(22) Filed: Aug. 25, 2009

(65) Prior Publication Data

US 2010/0051115 A1   Mar. 4, 2010

Related U.S. Application Data

(60) Provisional application No. 61/092,430, filed on Aug. 28, 2008.

(30) Foreign Application Priority Data

Aug. 28, 2008   (DK) ................................ 2008 01182

(51) Int. Cl.
*F16K 51/00*   (2006.01)

(52) U.S. Cl. ........................................ 137/240; 137/238

(58) Field of Classification Search .................. 137/238, 137/240, 614.17, 614.18
See application file for complete search history.

(56) References Cited

U.S. PATENT DOCUMENTS

| 6,676,047 B1 * | 1/2004 | Lindholm Jensen et al. . 137/240 |
| 7,891,376 B2 * | 2/2011 | Neuhauser et al. ...... 137/614.18 |
| 7,905,253 B2 * | 3/2011 | Burmester et al. ............ 137/240 |

FOREIGN PATENT DOCUMENTS

| DE | 38 35 944 C2 | 4/1997 |
| DE | 10 2007 027 464 A1 | 12/2008 |
| WO | 98/41786 A1 | 9/1998 |

* cited by examiner

*Primary Examiner* — Kevin Lee
(74) *Attorney, Agent, or Firm* — Roberts Mlotkowski Safran & Cole, P.C.; David S. Safran

(57) ABSTRACT

A cleaning system for cleaning a valve seat, where the valve seat is formed of at least one gasket for sealing between a housing and a stem, preferably for a double seat valve and where at least one guide band is centering the stem in the housing, where the stem has a cut out, allowing a cleaning liquid to flush the seat, when the stem is in a cleaning position, and where the guide band is still centering the stem while in the cleaning position. By putting the stem into a cleaning position, the cut out in the stem is positioned in the area of the gasket and thereby allowing the cleaning liquid to pass the gasket and the guide band via a small gap between the guide band and the stem itself. This way the seat is flushed with cleaning liquid and is thereby cleaned.

9 Claims, 6 Drawing Sheets

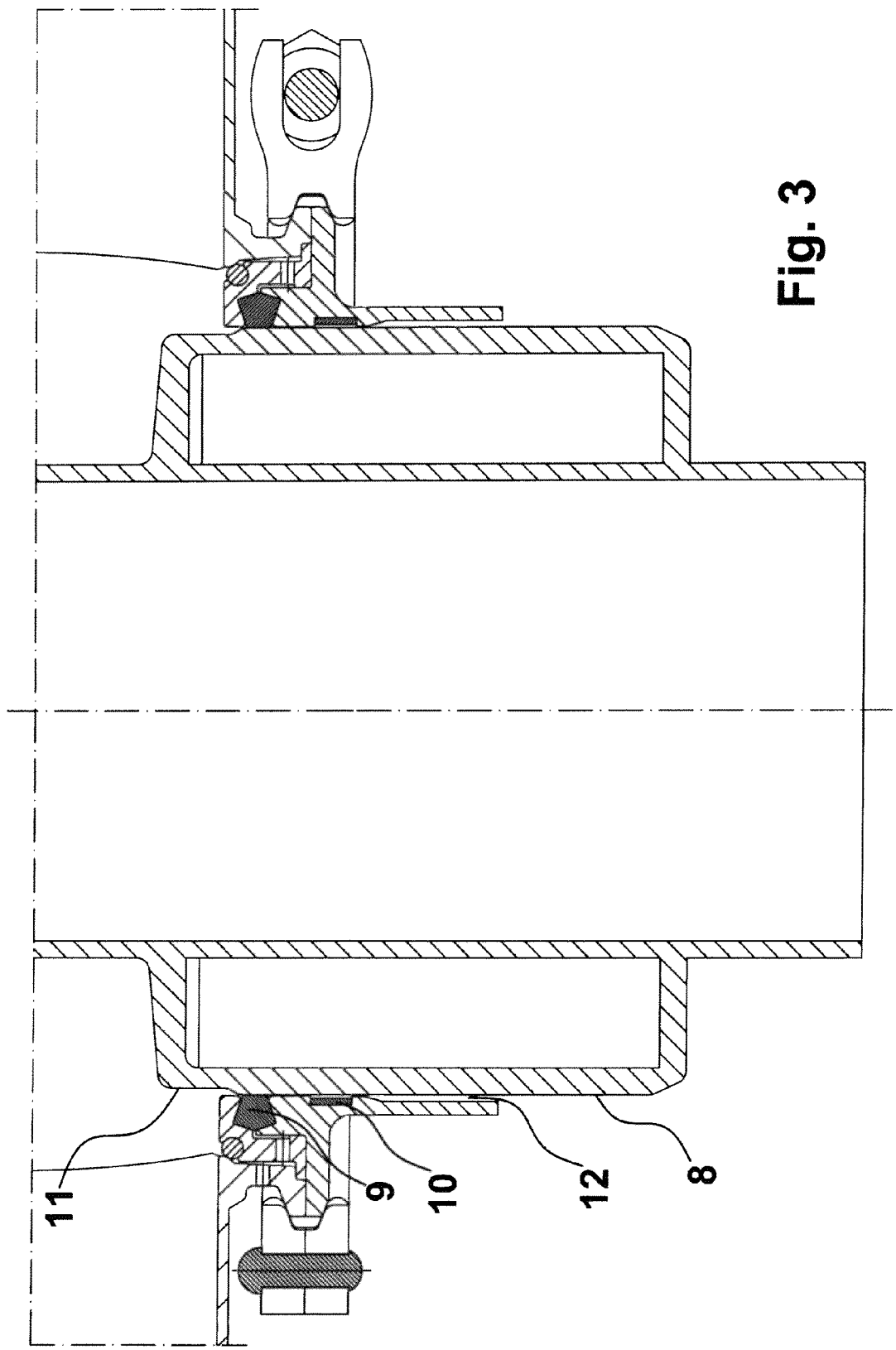

CLEANING SYSTEM FOR CLEANING A VALVE SEAT

FIELD OF THE INVENTION

The present invention relates to a cleaning system for cleaning a valve seat, where said valve seat consists of at least one gasket for sealing between a housing and a stem, preferably for a double seat valve and where at least one guide band is centring said stem in said housing.

BACKGROUND OF THE INVENTION

In various types of valves, i.e. double seat valves also known as mix proof valves, it is commonly known to clean a valve seat by circulating cleaning liquid through said open valve seat. The cleaning is done for hygienic reasons and is normally done in an automatic manner with a certain time interval or the like.

The valve can be cleaned with the valve seat fully open but the cleaning is mainly done with a partly open valve seat to minimize the amount of used cleaning liquid and at the same time a partly open valve seat also has the advantage that a flow of cleaning liquid is flushed through at the exact place that is to be cleaned. The valve seat to be cleaned can be positioned in-stream or end-stream.

A double seat valve—for instance—typically has an upper and a lower valve part and the specific primary valve parts are each centred with at least a gasket and a guide band. These parts are situated with a small distance and create a sealing between the housing and the stem connected to the valve part. During operation of the valve said gasket can and will be exposed to the medium flowing through the valve and thus the gasket and the guide band have to be cleaned due to hygienic demands.

In the known solutions such a cleaning has to be done by taking the valve apart or by a manual cleaning, where only the stem and the outer surfaces of the parts are cleaned, leaving the area between the gasket and the guide band in a somewhat unclean state.

OBJECT OF THE INVENTION

It is therefore an object of the present invention to provide an automatic, mechanical and quick system for cleaning a valve seat with a guide band and thus obtain a more hygienic and easier cleaning of said valve seat.

DESCRIPTION OF THE INVENTION

The present invention discloses, as mentioned above, a cleaning system for cleaning a valve seat, where said valve seat consists of at least one gasket for sealing between a housing and a stem, preferably for a double seat valve and where at least one guide band is centring said stem in said housing, where said stem has a cut out, allowing a cleaning liquid to flush the seat, when the stem is in a cleaning position, where the said cut out in the stem are located inside the valve and also on the inside according to the guide band and where the guide band still is centring the stem while in the cleaning position.

By putting the stem into a cleaning position the mentioned cut out of the stem is positioned in the area of the gasket and thereby allowing the cleaning liquid to pass the gasket and further to pass the guide band via a small gap between the guide band and the stem itself. Thereby the seat is flushed with cleaning liquid and is thus cleaned.

The seat, with the gasket and the guide band, which has to be cleaned can with advantage be constructed in such a way that the primary seat on the stem is cleaned at the same time, as this seat is also opened with a small cleaning gap, allowing the cleaning liquid to flush this seat at the same time.

The cut out in the stem can be made as a decrease in the diameter of the stem in the specific area of the gasket as can be seen in the following figures, but can also be made as a number of cut outs allowing the cleaning liquid to pass the seat.

In a preferred embodiment of a cleaning system according to the invention at least one and preferably more passages at said guide band is arranged at the surface facing towards the stem. These passages allow a larger amount of cleaning liquid to be flushed through the seat to be cleaned. This way a thin liquid curtain is created along the stem and the complete seat is cleaned sufficiently in a very short time and with the use of a very limited amount of cleaning liquid. The passages can be made by having a guide band with a number of small protrusions, preferably a large number of protrusions wearing against the stem, where the protrusions in this way make a passage for the cleaning liquid.

In a specific embodiment of a cleaning system according to the invention the guide band is with a cut out pattern, where said pattern forms one or more grooves from one end of the guide band to the other end of the guide band. The guide band will typically be made in a cylindrical shape and with said grooves on the internal surface in a direction from the end of the guide band facing the gasket to the opposite end. The guide band can be made with said grooves mainly in the axial direction of the stem but it can also be made with twisting grooves or with grooves with any other appearance such as varying width and depth of the grooves or protrusions.

In a preferred embodiment of a cleaning system, the grooves in the guide band all have the same geometrical shapes and in an alternative embodiment the grooves in the guide band have two or more different geometrical shapes. Depending on the specific seat and material to be cleaned from the seat, various designs of the pattern can be selected.

To allow a sufficient amount of cleaning liquid to pass the seat during a cleaning sequence the grooves cover at least 10% of the surface facing the stem and preferably between 20 and 50% or even more.

In yet another preferred embodiment of a cleaning system according to the invention the guide band can consists of a number of balls or rollers i.e. spherical balls arranged around a stem, in a ring shape, preferably by a frame or a string. Using balls—spherical or not—or rollers in the guide ring gives the big advantage that a very hygienic cleaning is possible as only very small contact areas will occur giving an optimum possibility to clean the area around the guide band 10. The balls or rollers 15 can be arranged close to each other, but can also be arranged in a fixed distance. Specific conditions will help to decide the best possible solution.

A cleaning system according to the invention can in a preferred embodiment be made with a guide band made from a low friction material such as PTFE or another material with appropriate specifications.

By using the system according to the invention a very fast and reliable cleaning of the seat is obtained and at the same time the demand for a hygienic solution is accomplished.

DESCRIPTION OF THE DRAWING

The invention will now be explained with reference to the accompanying drawing wherein:

FIG. 3 illustrates the same part as in FIG. 2 but with the seat in a closed position.

DETAILED DESCRIPTION OF THE INVENTION

Figure 1:
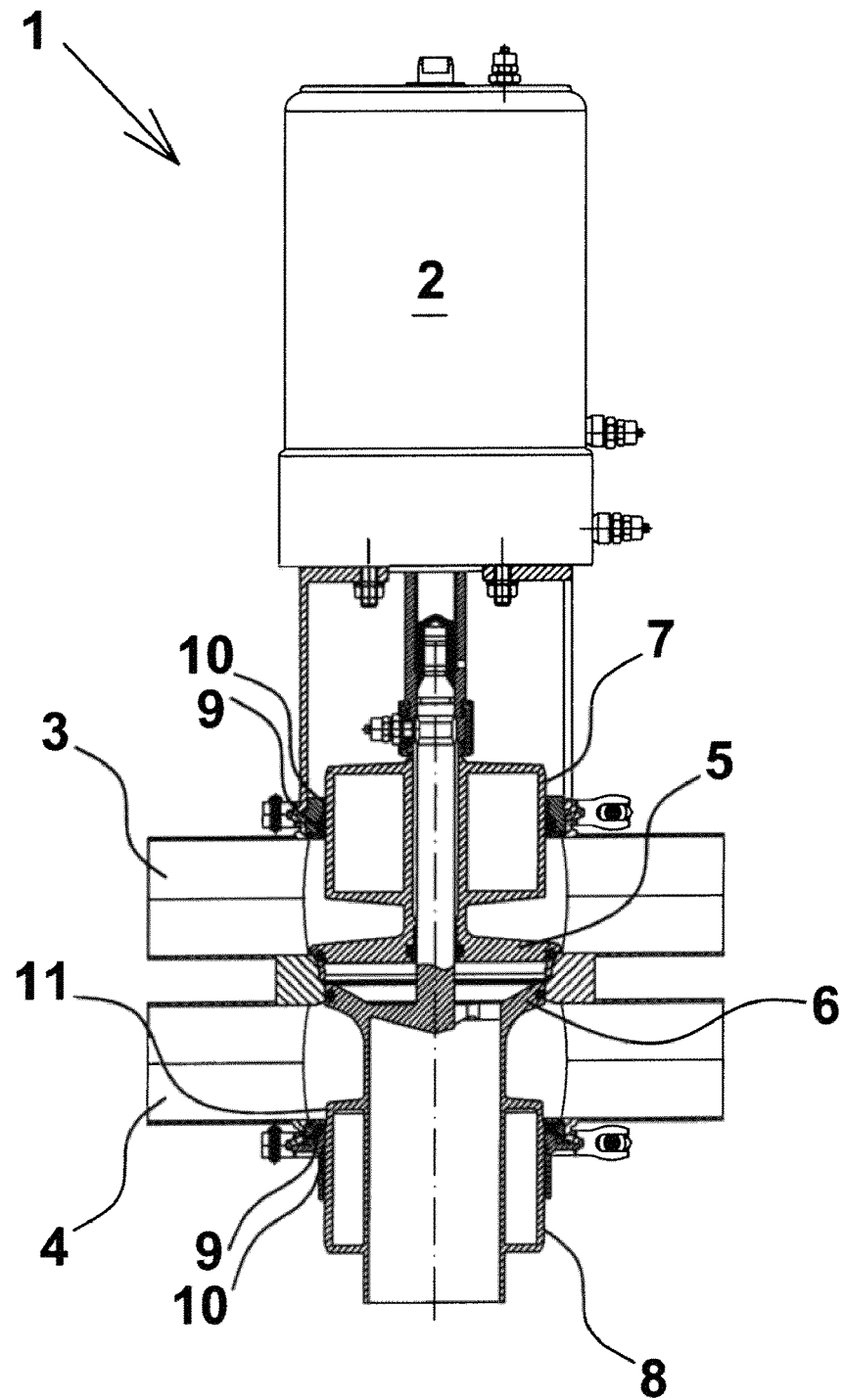
FIG. 1 illustrates a double seat valve

In FIG. 1 a double seat valve 1, with the actuator 2 for controlling the various valve parts is illustrated. The valve 1 consists of an upper pipe 3 and a lower pipe 4, two primary valve seats, where the upper valve part 5 is guided by an upper stem 7 and the lower valve part 6 is guided by a lower stem 8. Both the upper and the lower stem 7, 8 are centred by a gasket 9 and a guide band 10, where the gasket 9 is facing towards the pipes 3, 4 with the product or the cleaning liquid.

Figure 2:
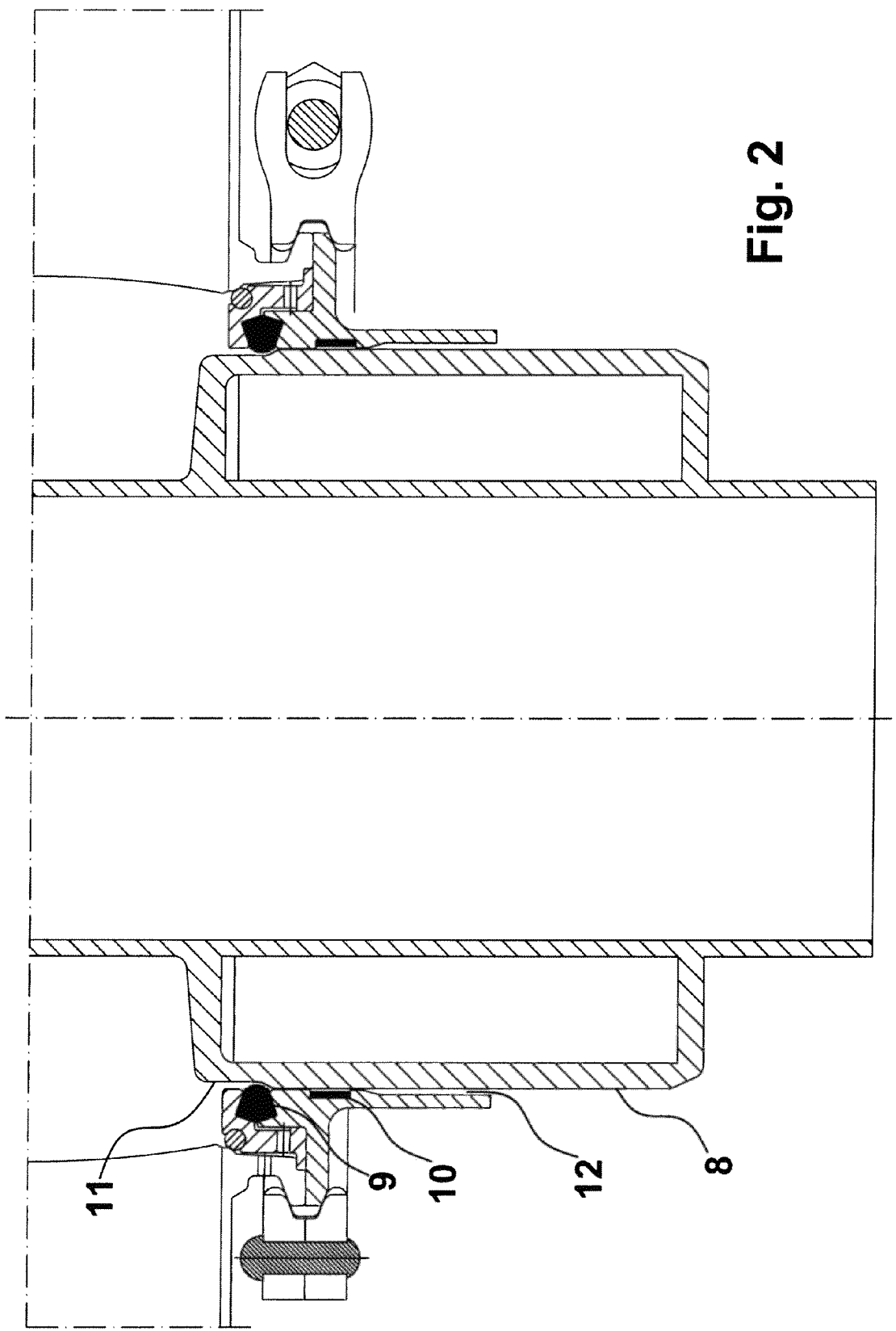
FIG. 2 illustrates a part of a valve with a seat in cleaning position

In FIG. 2 a close up of the seat with the gasket 9 and the guide band 10 is shown, and a cut out 11 in the stem 8 is clearly shown. When the stem 8 is moved downwards in an axial manner and the cut out 11 is brought to the gasket area, a slot 12 appears between the cut out 11 in the stem 8 and the gasket 9 and cleaning liquid from the lower pipe 4 is allowed to flush the seat. The cleaning liquid will due to a relatively high pressure force its way in between the guide band 10 and the stem 8. By having a number of grooves or protrusions 13 in the internal surface 14 of the guide band 10 a number of passages for the cleaning liquid are created and a curtain of cleaning liquid will then flush not only the gasket 9 and the guide band 10 in the seat but also the stem 8 will be cleaned. The stem 8 can of course be designed in such a way that the primary valve seat 6 also is cleaned at the same time, allowing the cleaning to take even shorter time. This can easily be done by designing the position of the cut out 11 in the stem 8 at a specific position.

The invention is of course not limited to a system for cleaning of a seat 6 in connection with the lower pipe 4, as the invention also can be used on the upper stem 7.

In FIG. 3 the illustrated valve parts are the same as those shown in FIG. 2. This figure only shows the stem 8 in a closed position, where the gasket 9 fits tightly to the stem 8, just below the cut out 11.

Figure 4A:
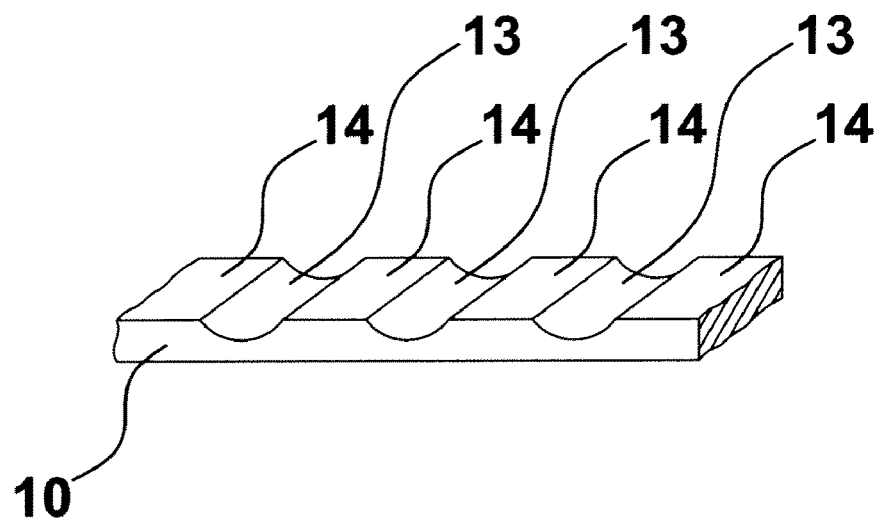
FIG. 4 illustrates a part of a guide band.

A part of a guide band 10 according to the invention is shown in FIG. 4a. As can be seen from the figure, the internal surface 14 has a number of equally spaced and shaped grooves 13. In this specific embodiment the grooves 13 are shaped as circular cut outs covering approximately half the internal ring-shaped area 14. When the cleaning liquid is flushed through the valve seat it passes the guide band 10 in the grooves 13 and partly in the very small slot between the stem 8 and the area 14 of the guide band 10 without the grooves 13. After passing the groove 13, the liquid will tend to expand like it does from a common nozzle, where the liquid is seeking to relieve the pressure, thus the area of the stem 8 between and just below the grooves 13 is also flushed. This way a very thoroughly cleaning takes place and the complete seat 9, 10 and the stem 8 are cleaned in a very fast and efficient manner.

The grooves 13 in the guide band 10 can of course be made in different shapes and forms, which can be specified for specific purposes.

Figure 4B:
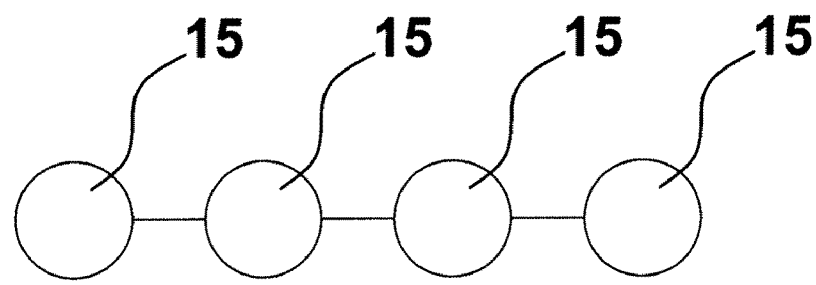
Figure 5:
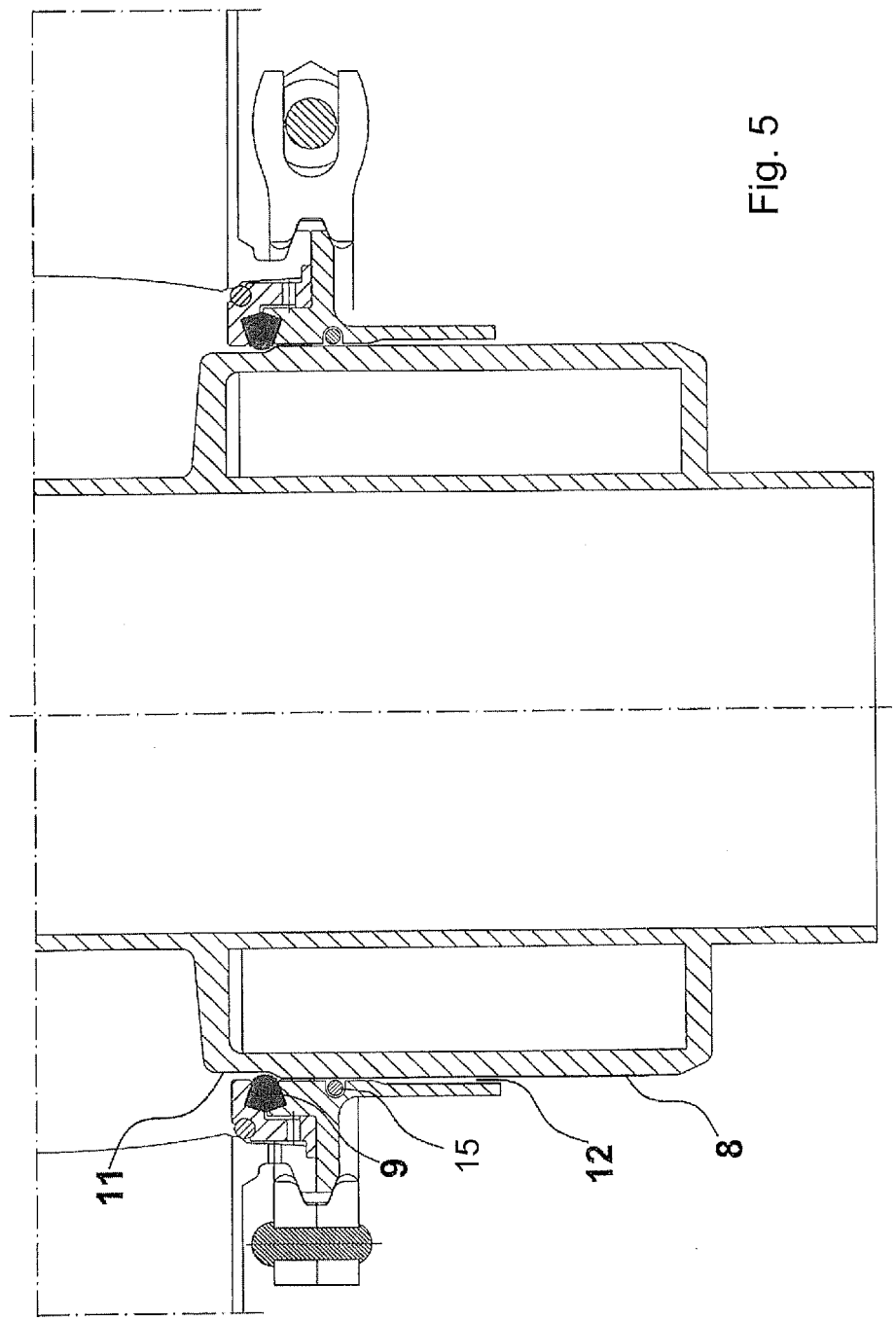
FIG. 5 is a view corresponding to that of FIG. 3, but showing an alternative form of guide band.
Figure 6:
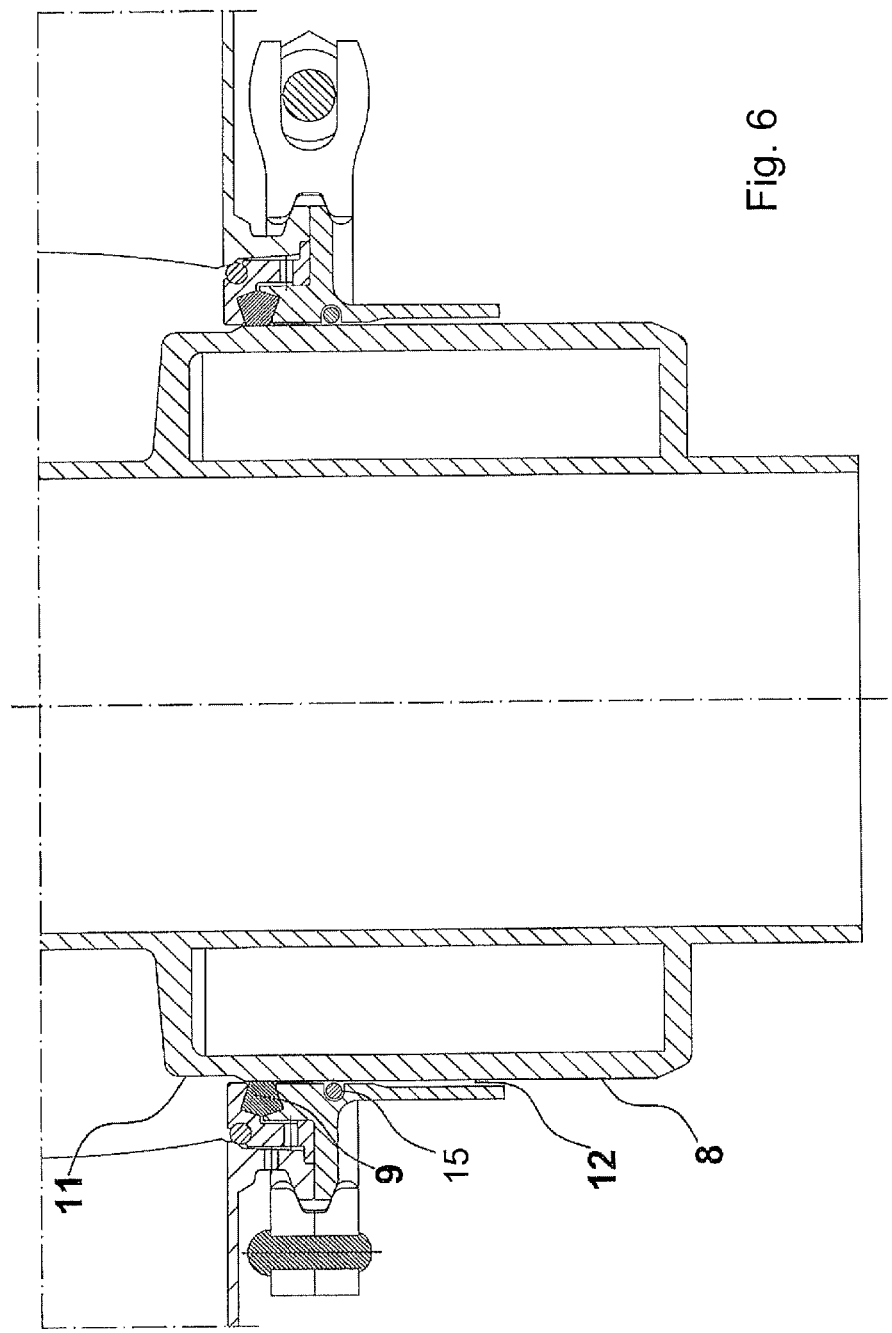
FIG. 6 is a view corresponding to that of FIG. 4, but showing the alternative form of guide band.

In FIG. 4b another embodiment of the guide band 10 is shown. This embodiment consists of a number of balls 15 arranged in a ring shape, where the individual balls 15 are fixed in this position by a not shown frame or string. The balls 15 are to be arranged in a groove in the valve housing and around a stem 8 as shown in FIGS. 5 & 6. The balls 15 are only in contact with the stem 8 and the valve housing in a small local area and it is thus easily to clean during flushing of the gasket 9.

The balls can be with a non spherical shape, i.e. with a cylindrical roller shape or with another suitable shape.

The invention is not limited to the embodiments described above and shown in the drawings; the invention can also be supplemented and modified in any manner within the scope of the invention as defined by the enclosed claims.

LIST OF POSITION NUMBERS

1 Double seat valve
2 Actuator
3 Upper pipe
4 Lower pipe
5 Upper valve part
6 Lower valve part
7 Upper stem
8 Lower stem
9 Gasket
10 Guide band
11 Cut out in the stem
12 Slot in gasket area
13 Grooves in guide band
14 Internal surface of guide band
15 Ball in a guide band

The invention claimed is:

1. A cleaning system for cleaning a valve seat, where the valve seat consists of at least one gasket for sealing between a housing and a stem, where at least one guide band is centring the stem in said housing, wherein the stem has a cut out, allowing a cleaning liquid to flush the seat, when the stem is in a cleaning position, where the cut out in the stem is located inside the valve and is also located closer to an inside of the valve than the guide band, and where the guide band still is centering the stem while in the cleaning position.

2. A cleaning system according to claim 1, wherein at least one or more passages at the guide band are arranged at the surface facing towards the stem.

3. A cleaning system according to claim 1, wherein the guide band is with a cut out pattern, where the pattern forms one or more grooves from one end of the guide band to the other end of the guide band.

4. A cleaning system according to claim 1, wherein the guide band is with grooves in the axial direction of the stem.

5. A cleaning system according to claim 1, wherein grooves in the guide band all have the same geometrical shape.

6. A cleaning system according to claim 1, wherein grooves in the guide band have two or more different geometrical shapes.

7. A cleaning system according to claim 1, wherein grooves cover at least 10% of the surface facing towards the stem.

8. A cleaning system according to claim 1, wherein the guide band consists of a number of balls arranged around a stem.

9. A cleaning system according to claim 1, wherein the guide band is made from a low friction material.

* * * * *